United States Patent [19]

Danker

[11] Patent Number: 5,244,377
[45] Date of Patent: Sep. 14, 1993

[54] TORIC POSTERIOR AND ANTERIOR CURVE DIES FOR MAKING CORNEAL CONTACT LENSES

[75] Inventor: Frederick J. Danker, Sarasota, Fla.

[73] Assignee: Standard Antiseptic, Inc., Tallevast, Fla.

[21] Appl. No.: 863,672

[22] Filed: Apr. 1, 1992

[51] Int. Cl.$^5$ .............................................. B29D 11/00
[52] U.S. Cl. ..................................... 425/542; 249/82; 249/155; 264/2.2; 264/313; 264/328.7; 425/440; 425/808
[58] Field of Search ............... 425/808, 440, 555, 542; 249/155, 82, 154, 159; 264/2.2, 313, 328.7

[56] References Cited

U.S. PATENT DOCUMENTS

| | | | |
|---|---|---|---|
| 3,273,204 | 9/1966 | Craddock | 425/808 |
| 4,188,353 | 2/1980 | Neefe | 264/313 |
| 4,208,365 | 6/1980 | LeFevre | 425/808 |
| 4,279,401 | 7/1981 | Ramirez et al. | 249/155 |
| 4,407,766 | 10/1983 | Haardt et al. | 249/155 |
| 4,447,372 | 5/1984 | Kreuttner | 425/808 |
| 4,909,969 | 3/1990 | Wood | 425/440 |

FOREIGN PATENT DOCUMENTS 0051027 5/1982 European Pat. Off. ............ 425/808

Primary Examiner—Khanh P. Nguyen
Attorney, Agent, or Firm—Morgan & Finnegan

[57] ABSTRACT

Dies for posteriors and anterior curves. A spherical surface is formed in the end of a body member, the side walls of which are compressed to change the spherical surface geometry to toric shape. The side wall is cylindrical and provided with two elongated slots which define two opposite ribs. A bolt passing through the ribs is tightened to provide the compressive forces.

9 Claims, 3 Drawing Sheets

TORIC POSTERIOR AND ANTERIOR CURVE DIES FOR MAKING CORNEAL CONTACT LENSES

FIELD OF INVENTION

The present invention relates generally to devices and methods for making plastic contact lenses and, more specifically, to dies having means for adjusting the toricity of the posterior and anterior curves of contact lenses.

BACKGROUND OF THE INVENTION

Lenses for correcting vision may be spherical, to correct the focus of the eye for near and far distances, or cylindrical or "toric", to correct an astigmatism of the eye.

Dies for molding plastic corneal contact lenses are generally know. Typically, the dies include a mold member made of steel and having an end face ground and polished to extremely precise specifications. Two mold members, one having a convex end face and the other having a concave end face, are juxtaposed to define a mold cavity which is subsequently filled with plastic material by injection molding to form a contact lens.

Conventional dies for forming plastic contact lenses have a fixed geometry so that, for variations in toricity, different dies must be employed. Thus, according to the prior art, a different mold member having a different, permanently shaped end face would be required for differently powered lenses.

An example of a prior art mold member is described in U.S. Pat. No. 3,871,813 to Cappeli. The patent describes a specific method of grinding and thus forming a convex surface on the end face of a mold member.

SUMMARY OF THE INVENTION

An object of the present invention is therefore to provide a lens die capable of variable geometry to provide different degrees of toricity.

Another object of the present invention is to provide a method of manufacturing a lens in which the toricity of the lens is adjusted by flexing a curved, mold surface of a die member.

Yet another object of the invention is to provide a toric corneal contact lens made by injection molding, wherein the curved mold surface for either the posterior or the anterior curves has a variable geometry.

These and other objects of the invention are met by providing a die mold for forming a curved surface of a lens, including a body member having an end face, the curved surface being formed at the end face and having a first radius of curvature, and means for flexing the end face to an extent that the curved surface of the end face assumes a second radius of curvature.

In another aspect of the invention, an apparatus for molding a plastic meniscus lens includes first and second body members juxtaposed on a common longitudinal axis to define a mold cavity, each body member including an end face having a curved surface, one curved surface having a concave geometry and the other surface having a convex geometry, each curved surface having a first radius of curvature, and means for flexing at least one of the end faces of the first and second body members to an extent that the corresponding curved surface assumes a second radius of curvature.

Another aspect of the invention involves a method of making a lens having at least one curved surface comprising the steps of forming a curved surface at an end face of a first die mold body member, the curved surface having a first radius of curvature, flexing the end face of the first die mold body member to an extent that the curved surface assumes a second radius of curvature, juxtaposing an end face of a second die mold body member next to the end face of the first die mold body member to define a mold cavity, positioning a die block around the mold cavity, and injecting plastic material into the mold cavity.

Other objects, advantages and salient features of the invention will become apparent from the following detailed description, which, taken in conjunction with the annexed drawings, discloses preferred embodiments of the invention.

DETAILED DESCRIPTION OF THE PREFERRED EMBODIMENTS

Figure 1:
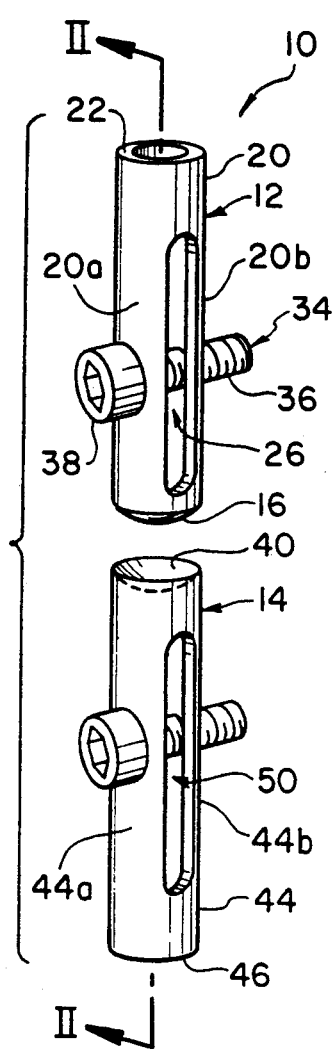
FIG. 1 is a perspective view of two toric posterior and anterior curve dies according to a preferred embodiment of the present invention.
Figure 2:
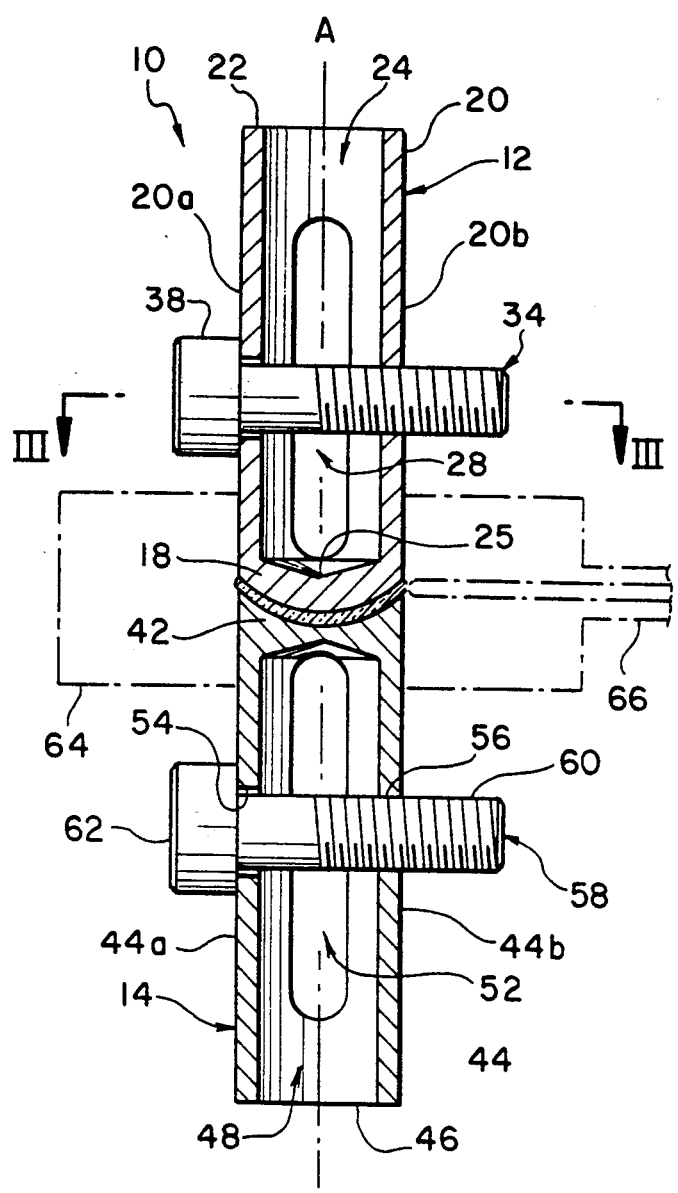
FIG. 2 is a longitudinal sectional view taken along II—II of FIG. 1, with the two die molds moved into juxtaposition and showing a die block positioned around the die molds for injection molding.

Referring initially to FIGS. 1 and 2, an apparatus for molding a plastic meniscus corneal contact lens is generally referred to by the numeral 10 and includes a first die mold body member 12 and a second die mold body member 14. Body member 12 has a curved end surface 16 which has a spherical convex geometry in its relaxed, non-flexed condition. The curved end surface 16 is formed on an outer side of an end wall 18 which is integral with a cylindrical side wall 20. An opposite end 22 of the body member 12 is open and an interior 24 of the body member 12 is hollow. The body member 12 is preferably made of hardened steel. In a preferred embodiment, a cylindrical bank is drilled from one end to form the cylindrical side wall 20. The central bore 24 has a diameter of about 0.282 inches, and the side wall has a thickness of 0.074 inches, thus giving 0.430 as the overall outer diameter of the body member 12. The central bore 24 is tapered at its inner most end to form an apex 25, as seen in FIG. 2. The apex is centered on the longitudinal axis "A" of the body member 12.

Figure 3:
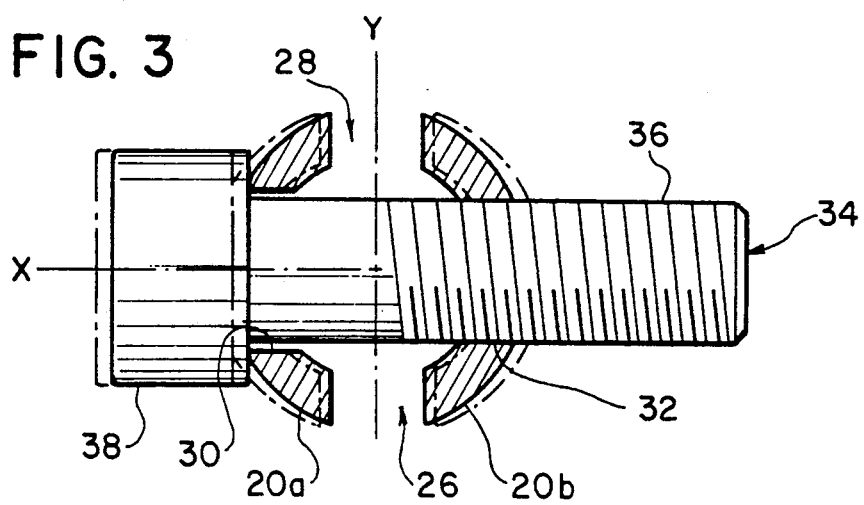
FIG. 3 is a transverse sectional view taken along lines III—III of FIG. 2.

A pair of ribs 20a and 20b are formed in the side wall 20 by two elongated, longitudinally disposed parallel slots 26 and 28, as seen in FIG. 3. The slots 26 and 28 have a width of about 0.188 inches. A pair of aligned transverse holes 30 and 32 are formed respectively in the ribs 20a and 20b. Hole 32 is threaded. A bolt 34 has threaded shank portion 36 which passes through hole 30 and threadedly engages the hole 32. A headed portion 38 abuts the outer surface of rib 20a when the bolt 34 is advanced sufficiently inwardly. The bolt 34 may be rotated in advance or retreat directions by using an appropriately sized hex wrench fitted in a socket formed in the headed portion 38 of the bolt 34.

The second body member 14 is similar in size and construction to the first body member 12 and has a curved end surface 40 having a spherical concave geometry. The curved end surface 40 is formed on an outer side of an end wall 42 which is integral with a cylindrical side wall 44. The opposite end 46 of the body member 14 is open and the central bore 48 is formed in the same manner as central bore 24. A pair of ribs 44a and 44b are formed in the side wall 44 by a pair of elongated slots 50 and 52. A pair of aligned transverse holes 54 and 56 are formed respectively in the ribs 44a and 44b. Hole 56 is threaded. A bolt 58 has a threaded shank portion 60 which passes through hole 54 and threadedly engages the hole 56. A headed portion 62 of the bolt abuts the outer surface of rib 44a when the bolt 58 is advanced sufficiently inwardly. The dimensions of the ribs, bore, etc., of the body member 14 are substantially the same as those of the body member 12.

As seen in FIG. 2, when the two die mold body members 12 and 14 are juxtaposed on a common longitudinal axis "A", a meniscus-shaped mold cavity is formed by the concave and convex surfaces. A die block 64 is fitted around the two body members and injection molded through an injection port 66. Without tightening either of the bolts 34 or 58, the resulting lens will be spherical.

Figure 4:
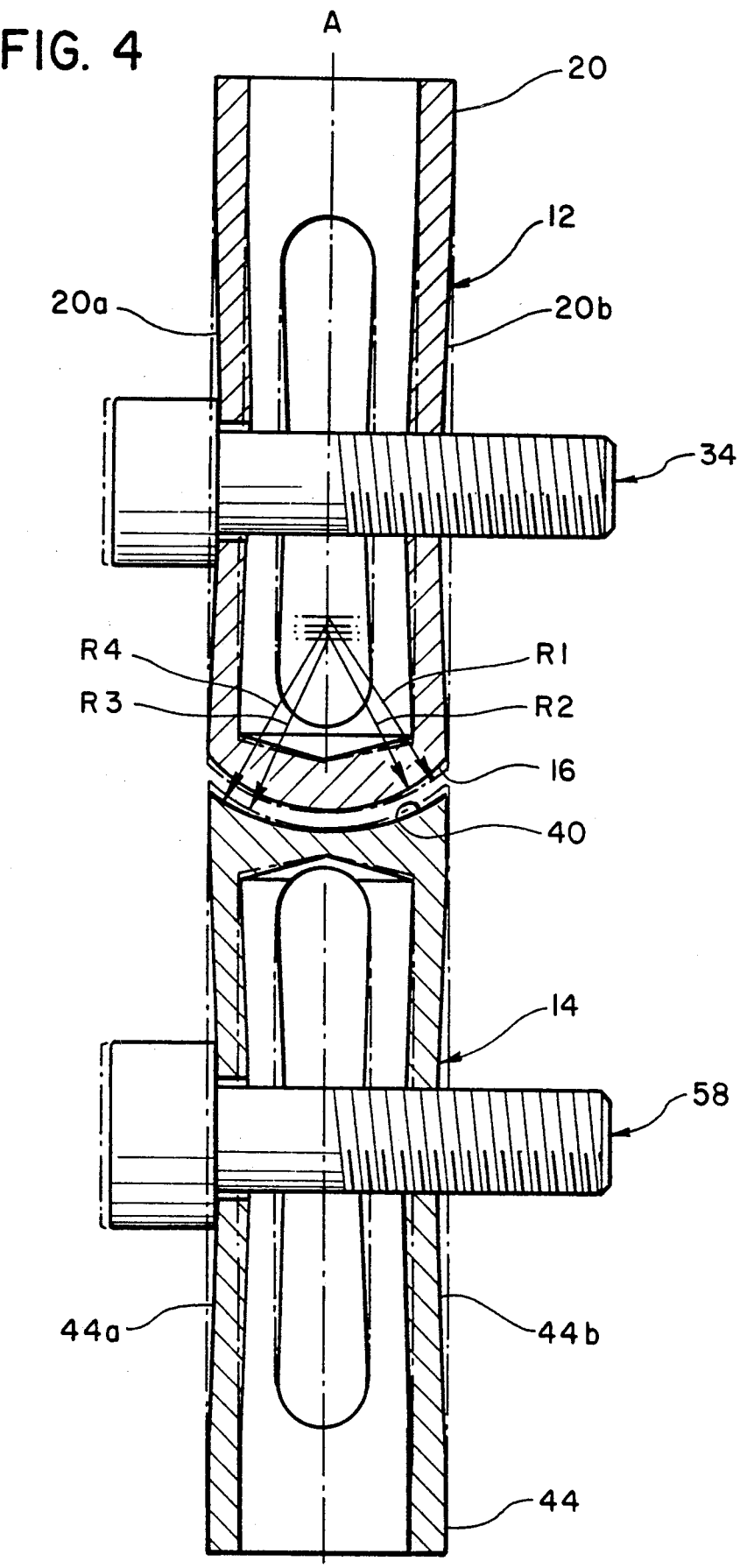
FIG. 4 is an enlarged vertical sectional view similar to FIG. 2, and showing inward flexing of the die mold ribs to vary the geometry of the end faces.
Figure 5:
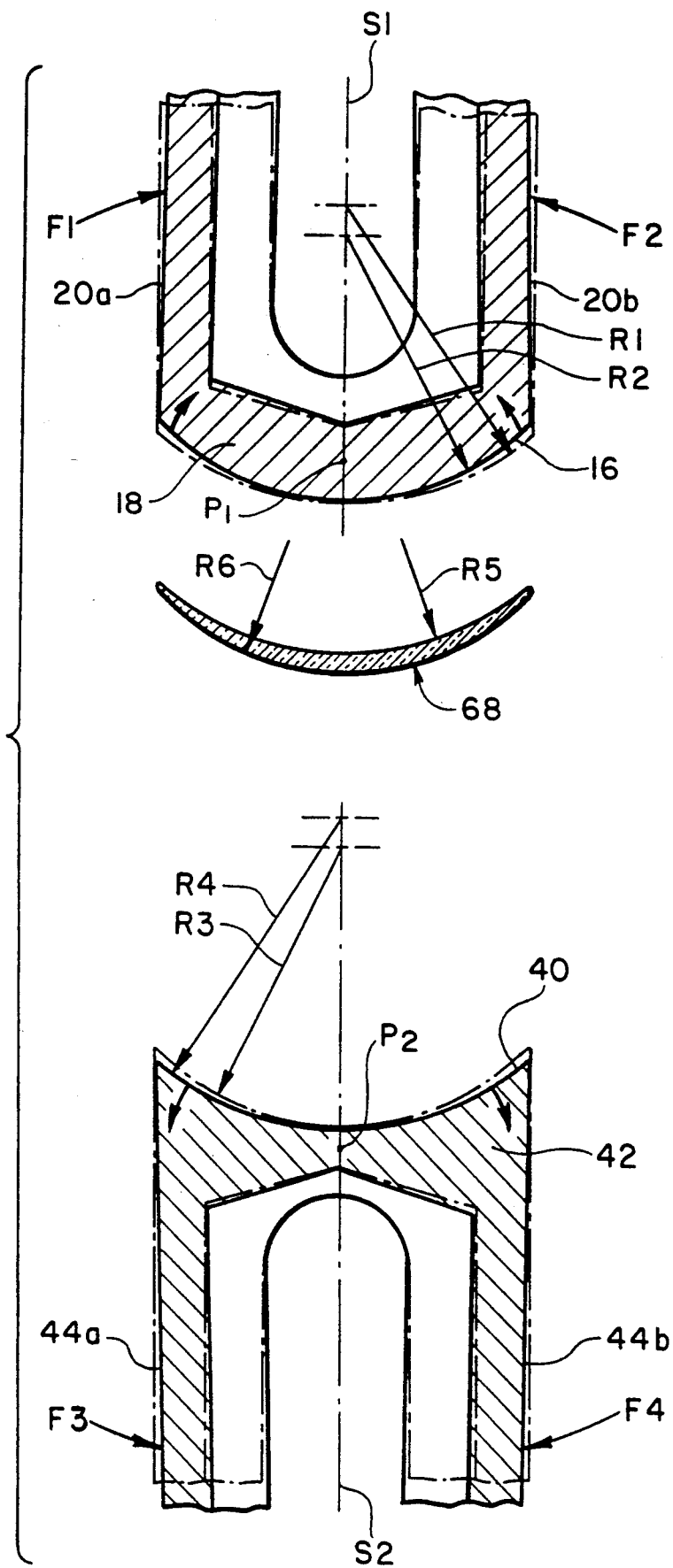
FIG. 5 is an enlarged schematic view of the two dies and resulting lens.

To change either one or both of the surfaces 16 and 40 from spherical to toric, the bolts 34 and 58 are tightened so as to flex the corresponding ribs inwardly. As seen in FIGS. 3 and 4, as the bolts move inwardly the corresponding curved surface changes geometry from spherical to toric. The amount of toricity can thus be varied in accordance with the amount of flexing of the ribs. With respect to the body member 12, the original or "relaxed" position of the body member is illustrated in phantom lines. The original radius of curvature of the curved surface 12 is R1. Preferably, at R1 the surface 16 is spherical. When the bolt 34 is tightened, the radius of curvature changes to R2 with respect to the X axis seen in FIG. 3. The result is an astigmatic surface having two optical curves formed at 90° to each other. R2 is shorter that R1, and its pivot center, as better seen in FIG. 5, is spaced from the pivot center of R1 closer to the apex of the curved surface 16 so that in spite of the smaller radius the apex of the curve remains in the same position.

Similarly, R3 is the radius of curvature of the curved surface 40 when the body member 14 is in its initial, relaxed state. R4 is the radius of curvature after the bolt 58 is tightened so that the ribs 44a and 44b flex inwardly. As more clearly seen in FIG. 5, R3 is shorter than R4, and the pivot center of R4 is spaced further from the Apex of the curved surface 40.

Again referring to FIG. 5, the inward flexing of ribs 20a and 20b is the result of substantially equal and opposite forces F1 and F2 generated by tightening bolt 34. These bending forces cause the end wall 18 to bend symmetrically about pivot point P1, as shown by the directional arrows. P1 is located in the vertical plane of symmetry S1, which essentially divides the integral structure of the ribs 20a, 20b and end wall 18 into two opposed levers, joined at S1. The resulting lens 68 has an inner diameter or posterior curved surface of radius R5 and an outer diameter or anterior curved surface of radius R6.

The inward flexing of ribs 44a and 44b is the result of equal and opposite forces F3 and F4 generated by tightening bolt 58. These bending forces cause the end wall 42 to bend symmetrically about the pivot point P2. P2 is located in the vertical plane of symmetry S2 which divides the integral structure of the ribs 44a, 44b and end wall 42 into two opposed levers, joined at S2. Bending forces F3 and F4 thus increase the radius of curvature of the concave surface 40 in the X-axis direction. The amount of toricity of the surface 42, as a result of the bending force, can be varied to achieve a desired optical effect.

Generally, one of the anterior and posterior surfaces is formed spherical and the other is astigmatic. The practical limit of variation in curvature allows the present invention to provide a lens powered from about 0 to 6 diopters. Each 0.5 mm change in radius of curvature amounts to about 0.25 diopter change in optical power.

Other tightening devices may be employed. For example, the bolts may extend through non-threaded holes and engage threaded nuts. Other threaded devices could be employed to either draw the ribs inwardly or expand them outwardly thus providing both positive and negative adjustment. Also, other rib and body member structures may be employed, so long as a lever structure is created for symmetrically bending the end wall which is formed with the curved surface.

While an advantageous embodiment has been chosen to illustrate the invention, it will be understood by those skilled in the art that various changes and modifications can be made therein without departing form the scope of the invention as defined in the appended claims.

What is claimed is:

1. A die mold for forming a curved surface of a lens, comprising:
   a body member having a curved end surface having a first radius of curvature; and
   means for flexing the end surface to an extent that the curved end surface assumes a second radius of curvature,
   wherein the body member has two spaced apart, diametrically opposed ribs, and the flexing means comprises first and second transverse aligned holes and means, extending through the first and second holes, for adjustably drawing the two ribs closer together.

2. A die mold according to claim 1, wherein the second transverse hole is threaded, and the drawing means comprises a threaded fastener having a threaded shank portion extending through the first transverse hole and threadedly engaging the second transverse hole, the headed portion being in abutment with one of the ribs so that as the threaded fastener is rotated in an advance direction the two ribs are caused to flex inwardly.

3. A die mold according to claim 1, wherein the curved surface has a spherical convex geometry prior to flexing and a toric geometry after flexing.

4. A die mold according to claim 1, wherein the curved surface has a spherical concave geometry prior to flexing and a toric geometry after flexing.

5. A die mold according to claim 1, wherein the body member is made of hardened steel.

6. An apparatus for molding a plastic meniscus lens comprising:
   first and second body members juxtaposed on a common longitudinal axis to define a mold cavity, each body member including a curved end surface, one curved surface having a concave geometry and the other curved surface having a convex geometry, each curved surface having a first radius of curvature; and means for flexing at least one of the curved surfaces of the first and second body members to an extent that the corresponding curved surface assumes a second radius of curvature, wherein each body member has two spaced apart, diametrically opposed ribs, and the flexing means comprises first and second transverse aligned holes and means, extending through the first and second holes, for adjustably drawing the two ribs closer together.

7. A die mold according to claim 6, wherein the second transverse hole is threaded, and the drawing means comprises a threaded fastener having a threaded shank portion extending through the first transverse hole and threadedly engaging the second transverse hole, the headed portion being in abutment with one of the ribs so that as the threaded fastener is rotated in an advance direction the two ribs are caused to flex inwardly.

8. A die mold according to claim 6, wherein the curved surfaces of the first and second body members are spherical.

9. A die mold according to claim 6, wherein the body member is made of hardened steel.

* * * * *